United States Patent [19]
McKenzie

[11] 3,740,957
[45] June 26, 1973

[54] APPARATUS FOR STABILIZING A BARGE
[76] Inventor: Robert J. McKenzie, Bank of Salesburg Bldg., Galesburg, Ill.
[22] Filed: Feb. 8, 1971
[21] Appl. No.: 113,423

[52] U.S. Cl............. 61/48, 61/65, 114/72, 114/230, 214/14
[51] Int. Cl.......... E02b 3/20, B63b 25/00
[58] Field of Search.......... 61/48, 46.5, 46, 61/65, 64; 114/72, 230, 231; 214/14, 12

[56] References Cited
UNITED STATES PATENTS

| | | | |
|---|---|---|---|
| 268,177 | 11/1882 | Bowe | 61/65 |
| 1,059,201 | 4/1913 | Pasquier | 114/231 X |
| 3,559,606 | 2/1971 | Gregory | 61/65 |
| 1,463,558 | 7/1923 | Sibley | 214/14 X |
| 2,247,144 | 6/1941 | Baldwin | 114/72 X |
| 3,069,862 | 12/1962 | Ward | 61/48 |
| 2,881,590 | 4/1959 | Zaskey | 61/46.5 |
| 2,857,744 | 10/1958 | Swiger et al. | 61/46.5 |
| 3,332,248 | 7/1967 | Burnett | 61/65 |
| 2,540,878 | 2/1951 | Hayward | 61/46.5 |
| 2,894,650 | 7/1959 | Black et al. | 214/14 |
| 2,907,172 | 10/1959 | Crake | 61/65 X |

FOREIGN PATENTS OR APPLICATIONS

| | | | |
|---|---|---|---|
| 195,377 | 2/1968 | U.S.S.R. | 61/65 |

Primary Examiner—Jacob Shapiro
Attorney—Gary M. Polumbus

[57] ABSTRACT

An apparatus for stabilizing a barge at a loading and/or unloading site includes a plurality of pilings with portions adapted for connection to a barge. The barge is also provided with connection means and means are provided for attachment to said connection means whereby the level of the barge can be adjusted in the water to a selected level.

7 Claims, 12 Drawing Figures

PATENTED JUN 26 1973
3,740,957
SHEET 1 OF 3
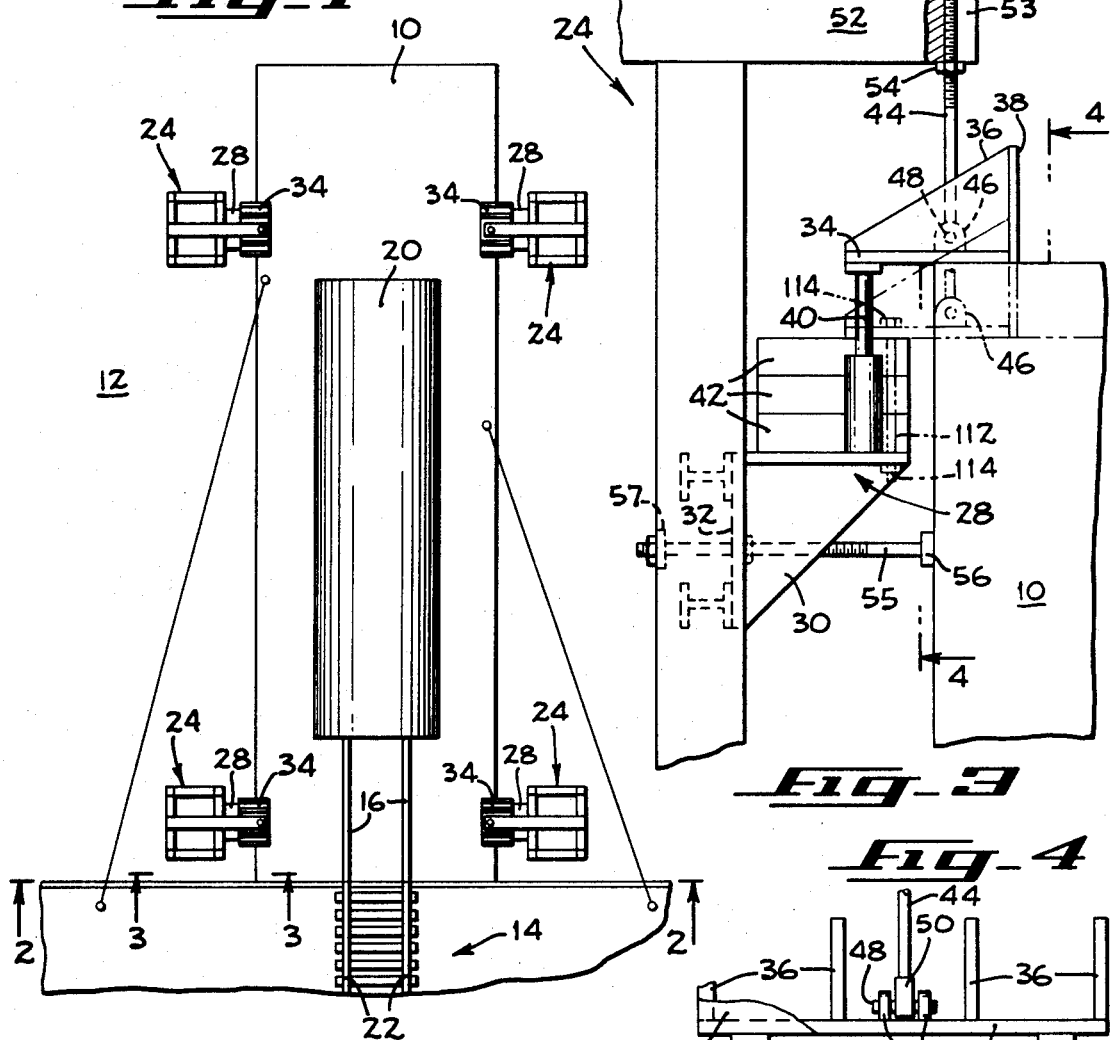
INVENTOR.
ROBERT J. MCKENZIE
BY Gary M. Polumbus
ATTORNEY

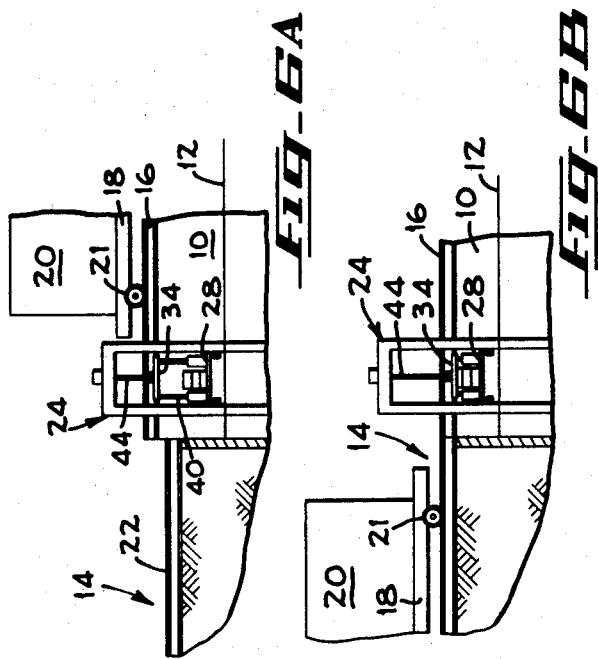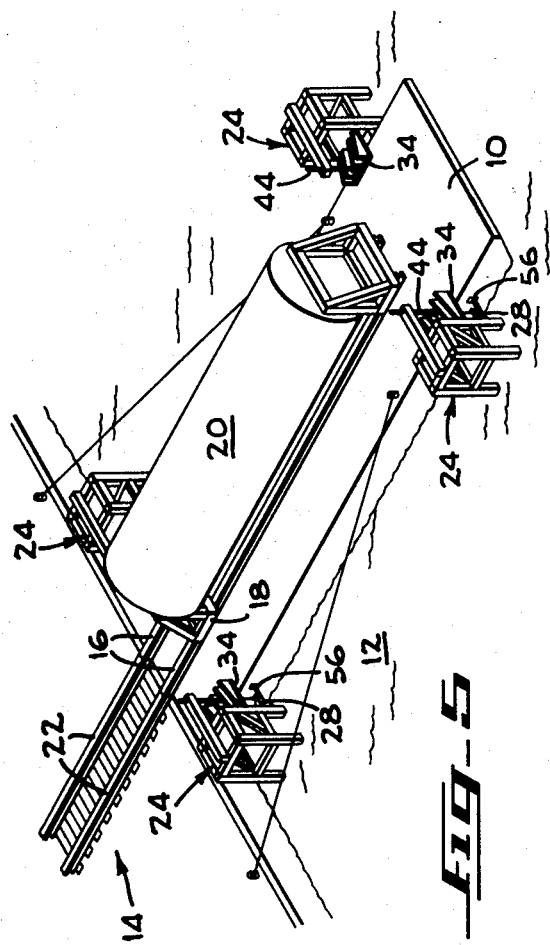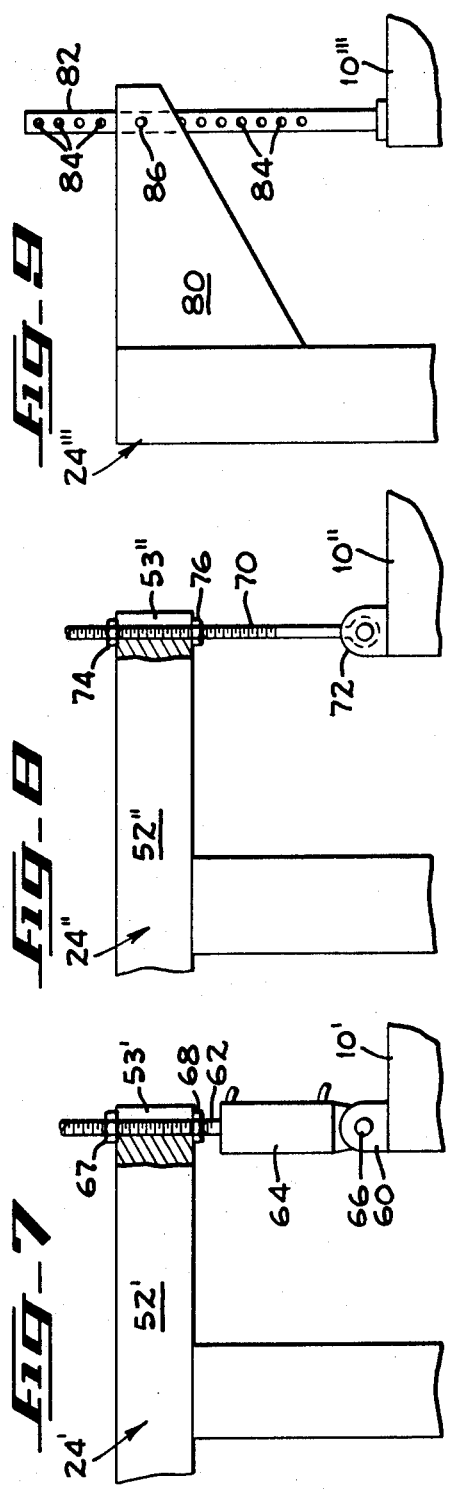

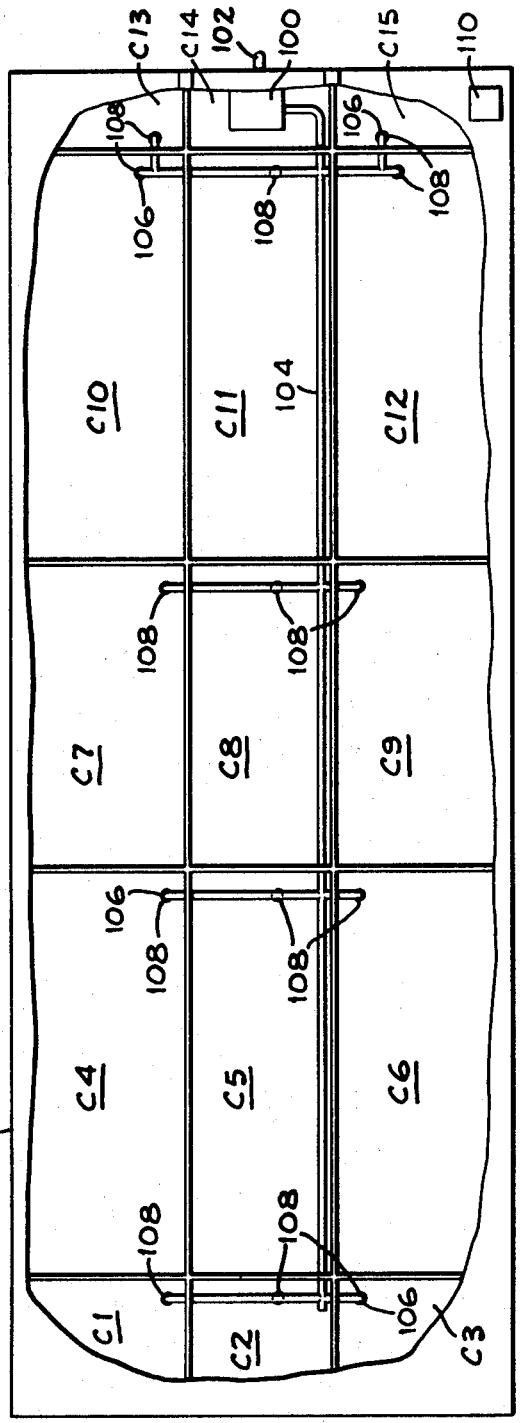
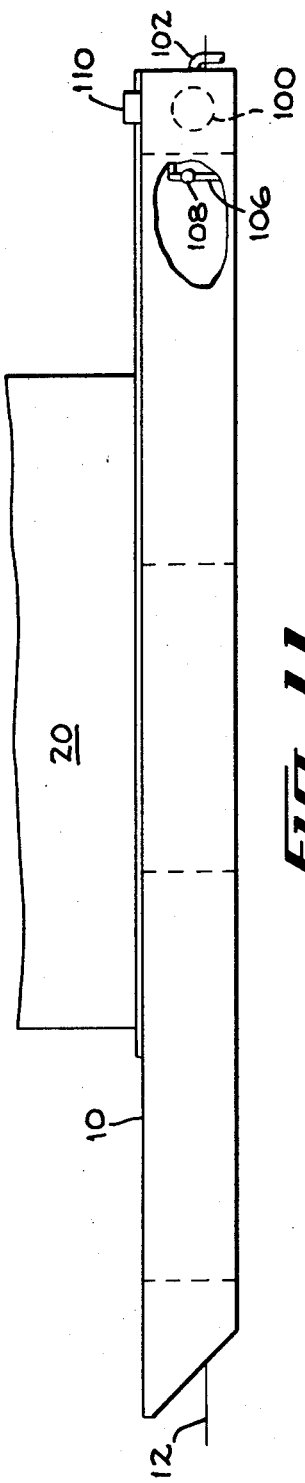

//3,740,957//

APPARATUS FOR STABILIZING A BARGE

BACKGROUND OF THE INVENTION

1. Field of the Invention

The present invention generally concerns the stabilization of barges but more particularly is concerned with the stabilization of barges carrying a nuclear reactor vessel whereby the vessel can be rolled off the barge onto an adjacent dock or landing without danger of the barge heeling and possibly dumping the reactor into the body of water.

2. Description of the Prior Art

Many nuclear reactor vessels used in the generation of nuclear power are so large that it is impossible to transport them by rail or truck from the manufacturing to the installation site. It is, therefore, necessary that they be manufactured at the installation site or transported by barge from the manufacturing to the installation site along a navigable body of water. Inasmuch as the vessels are extremely heavy and bulky and cannot be unloaded like most barge cargoes such as coal, grain, etc., it has become important to develop a method of stabilizing the barge whereby the reactor can be unloaded without danger of the barge heeling, shifting, buckling or sinking in any manner.

Of necessity, a good number of reactors need be unloaded at remote sites where no gantry cranes or other like heavy duty industrial equipment are available to pick the reactor up and remove it from the barge. It is therefore, common practice when unloading at such remote sites to mount the reactor on a roller frame which is adapted to ride on rails secured to the barge. When the reactor is to be unloaded, the barge is stabilized adjacent the unloading area where additional rails are provided onto which the reactor can be rolled from the barge.

Due to the extremely high value of the nuclear reactors, those individuals responsible for unloading a reactor laden barge have heretofore been agreeable to spending vast sums of money to guarantee the safe unloading of the reactor and even at the present expensive cost are not entirely satisfied with respect to the safety of the reactor vessel. The cost is primarily due to the expense of positively stabilizing the barge, but in addition includes a large insurance expense which is normally dependent on the reliability of the method used to stabilize the barge for unloading.

To date, numerous methods of stabilizing the barge have been used. One method has been to lay a large sub-surface bed of concrete adjacent the unloading site whereby the barge can be positioned over the concrete bed and flooded to sink down and rest on the bed. Once in this position the barge is stable enough so that the reactor can be rolled off the barge onto the rails at the unloading site. This is a reliable method of unloading the barge but is unnecessarily expensive and requires a very accurate dredging operation to prepare the sub-surface terrain for the concrete bed.

Another method known to applicant is to prepare a sub-surface rock bed adjacent the unloading site whereby the barge can be positioned over the rock bed and flooded to sink down and rest on the bed, as with the beforementioned concrete bed method, and subsequently roll the reactor off the barge onto the rails at the unloading site. This method, even though normally less expensive than the concrete bed method, is less reliable inasmuch as the rock bed is susceptable to scour by water currents and wave action. In many instances this method would require some kind of protection from current scour, such as an upstream wall of sheet piling, thus increasing the expense of the unloading operation.

SUMMARY OF THE INVENTION

The method and apparatus of the present invention basically involves the stabilization of a barge by adjustably securing the barge to previously driven steel, concrete, or wood pilings which are designed to withstand the known applied loading. The method and apparatus utilizes the structural strength of the barge along with the strength of the pre-designed pilings to positively secure the barge whereby previously troublesome environmental conditions such as current scour and the like, have no effect on the stabilization of the barge.

The method involves driving piles or pile clusters into the sub-aqueous bottom of the body of water, securing adjustable means to the pile clusters to operatively attach the pile clusters to a barge positioned adjacent thereto, positioning a barge adjacent and between the pile clusters, attaching the adjustable means to the barge so that the barge is positively connected to the piles, and adjusting the level of the barge in the water so that the barge is suitably and positively disposed for loading or unloading operations. Several means for adjustably securing the barge to the pile clusters will be described hereinafter, each of which is characterized by structural qualities of which the strength can be determined by well known strength of material principles. The method is, therefore, very reliable in that it utilizes proven scientific principles and is not affected by unpredictable environmental conditions. In addition the method would normally be less expensive to execute than previously known methods in that it does not require a dredging operation or precautionary measures to protect against unpredictable environmental conditions. Of importance also is the fact that in all probability the insurance cost for the barge cargo would be less since the method used to stabilize the barge is a positive method which relies on well known scientific principles.

Accordingly, it is an object of the present invention to provide a method of and apparatus for stabilizing a barge wherein the barge is held under positive control.

It is another object to provide a method of and apparatus for stabilizing a barge which utilizes the known strength of the barge and the pre-determined strength of the pile clusters to positively control the barge.

It is still another object to provide a method of and apparatus for stabilizing a barge so that a heavy article such as a nuclear reactor vessel can be rolled off the barge without the barge heeling or the barge buckling during load transfer.

It is still another object to provide a relatively quick method of unloading a barge which saves appreciably in the unloading cost.

It is still another object to provide a relatively inexpensive method of stabilizing a barge for the unloading of a nuclear reactor vessel.

BRIEF DESCRIPTION OF THE DRAWINGS

FIG. 1 is a plan view of a barge carrying a nuclear reactor with the barge being stabilized by the method of the present invention.

FIG. 2 is a view taken in the direction of arrows 2—2 of FIG. 1.

FIG. 3 is an enlarged fragmentary view taken in the direction of arrows 3—3 of FIG. 1 showing one embodiment of the adjustable means used to regulate the height of the barge in the water.

FIG. 4 is a view taken along line 4—4 of FIG. 3.

FIG. 5 is an isometric view of the barge shown in FIG. 1.

FIGS. 6A and 6B are operational views showing the barge before and after it has been stabilized for unloading of a nuclear reactor vessel.

FIG. 7 is an enlarged fragmentary diagrammatic view showing an alternative means for regulating the height of the barge in the water.

FIG. 8 is an enlarged fragmentary diagrammatic view showing another alternative means for regulating the height of the barge in the water.

FIG. 9 is an enlarged fragmentary diagrammatic view showing still another alternative means for regulating the height of the barge in the water.

FIG. 10 is a plan view of the barge of FIG. 1 with a portion of the deck broken away to show the internal flooding chambers of the barge.

FIG. 11 is a side elevation of the barge of FIG. 1 with the flooding chambers shown in hidden lines.

DESCRIPTION OF THE PREFERRED EMBODIMENTS

Referring to FIGS. 1 and 2, a barge 10 can be seen floating in a body of water 12 adjacent an unloading site 14. The barge includes on its deck a set of rails 16 upon which a carriage 18 supporting a nuclear reactor vessel 20 is resting. The carriage 18 has a set of rail engaging wheels 21 so that it can be rolled along the rails 16 when the reactor is being loaded onto or unloaded from the barge. The unloading site 14 is also provided with a set of rails 22 of the same gauge as rails 16 so that when the barge is properly stabilized and positioned in the water, the reactor supporting carriage can be rolled off the barge and onto the adjacent land.

The apparatus utilized to stabilize and position the barge is disclosed as including identical pile clusters 24 which are driven deep enough into the water bottom 26 to provide the strength necessary to positively support the barge. The depth to which the pile clusters are driven, their design, and the number of clusters necessary can be predetermined by known procedures which take into consideration the soil content, structural data relating to the material used for the pile clusters, the weight of the barge plus its load, etc.

Each pile cluster is equipped with means to adjustably secure the barge to the pile cluster so that it can be moved vertically in the water. One such means is shown in detail in FIGS. 3 and 4 and includes on each pile cluster a stop plate 28 with stiffeners 30 and a back plate 32 to give it added strength. The stop plates are welded or otherwise rigidly secured to the back plate and stiffeners and the back plate is welded or otherwise rigidly secured to the pile cluster. Corresponding similarly constructed stop plates 34 having stiffeners 36 and a back plate 38 are welded or rigidly secured to the barge deck so as to partially overhang at locations corresponding to the several pile cluster locations. When the barge is properly positioned between and adjacent the pile clusters the lower face of stop plates 34 and the upper face of stop plates 28 are facing each other so that, barring any obstructions on the stop plates, if the barge were lowered deeper into the water the respective stop plates would eventually come into face-to-face abutting contact.

To facilitate control and regulation of the depth of the barge in the water, a pair of jacks 40 are provided on the upper face of each stop plate 28. Thus to regulate the depth of the barge in the water once it is positioned between the pile clusters, it is only necessary to flood the barge in a conventional manner causing it to sink lower into the water until the barge stop plates 34 engage the upper supporting surface of the jacks, and then to regulate the extension of the jacks' upper supporting surfaces until the barge is at the desired depth in the water. The desired depth of course is that at which the rails 16 on the barge align with the rails 22 at the unloading site. The jacks may be any type of heavy duty jacks preferably mechanically or hydraulically actuated.

To avoid undue strain and wear on the jacks, support blocks 42 could be stacked on stop plates 28 to the desired height so that the jacks could be lowered allowing the entire weight of the barge to rest on the blocks 42 and at the same time maintaining the barge at the proper depth in the water.

As a safety factor and to further stabilize the barge in the water at the desired depth a large diameter threaded bolt 44 may be secured to the barge as by attachment to the upper face of stop plate 34. For this purpose a bifurcated bracket 46 is shown welded to the stop plate 34 having a pivot pin 48 passing through the upwardly extending arms of the bracket and through an end portion 50 of the threaded bolt which is received between the arms of the bracket. The associated pile cluster 24 is provided with a horizontal extension 52 having a vertical slot 53 cut in its outermost end to freely receive the upper threaded portion of the bolt 44. Locknuts 54 threadedly secured on the bolt, one on either side of the extension 52, are provided to lock the bolt at the desired position relative to the extension 52 and to prevent the bolt from pivoting relative to the pile cluster once it is locked in place. It is evident that when all of the bolts are prevented from pivoting relative to the pile clusters, the barge will consequently be prevented from pivoting relative to the bolts. Of course, the desired relative position between the bolts and the extension is that which the bolts and the extensions assume when the rails 16 on the barge are aligned with the rails 22 at the unloading site.

It is normally desirable in addition to vertically positioning and stabilizing the barge to horizontally position and stabilize the barge in a centered or other desired location between the pile clusters. To obtain a horizontal stabilized position each pile cluster is provided with a pair of threaded horizontally extending positioning rods 55 having padded abutment heads 56 to prevent the rods from damaging the side of the barge. Each rod 55 is secured to its associated pile cluster by a pair of ears 57 (only one being shown) welded to the pile cluster and having an internally threaded bore to threadedly receive the rod. Thus, once the barge is positioned between the pile clusters it can be horizontally locked in place by extending the rods inwardly until they each abut the adjacent side of the barge.

When preparing to unload a barge carrying an item such as a nuclear reactor vessel by the method of the present invention, it would first be necessary to drive a pre-selected number of piles or pile clusters 24 to a predetermined depth at a spacing and in a pattern designed to accommodate therebetween the barge on which the vessel is loaded. Once the piles are driven, the barge could be positioned between the pile clusters and in close juxtaposition to the unloading site as shown in FIG. 6A. The horizontal positioning rods could then be moved into abutting contact with the sides of the barge to prevent the barge from moving in a horizontal plane. When the barge is so positioned, the stop plates 34 secured to the barge should be vertically aligned with the stop plates 28 mounted on the pile clusters. The barge is then flooded with water until its buoyancy is no longer sufficient to keep it afloat. It will then settle in the water until the stop plates 34 on the barge come into abutting contact with the jacks 40 which are standing on the stop plates 28. The jacks are then extended or withdrawn to raise or lower the barge accordingly, to cause the rails 16 on the barge to align with the rails 22 at the landing site as in FIG. 6B. The barge will then be very adequately stabilized with a portion of the weight of the barge resting on the jacks thereby creating a frictional force between the jacks' supporting surface and the stop plate 34 which will prevent the barge from moving under normal unloading conditions. As pointed out hereinbefore, to avoid wear and strain on the jacks, blocking 42 could at this point be placed, as illustrated in FIG. 3 and 4, between the stop plates 28 and 34 to support the barge, in which case the jacks could be withdrawn from supporting engagement with stop plate 34. Also as hereinbefore pointed out, to further stabilize the barge at this point and to assure the desired depth of the barge in the water, the bolts 44 could be pivoted about pins 48 and thereupon placed in slots 53 in the pile cluster extensions 52, and locked in place by locknuts 54. Once the bolts are secured to the pile clusters the barge would be positively stabilized with no pssiblity of shifting, heeling, or otherwise moving in the water when the heavy reactor vessel is rolled off the barge. Nor could normal environmental conditions such as scour or wave action affect the position of the boat in the water.

Another embodiment of an apparatus for vertically positioning and stabilizing a barge according to the principles of the present invention is shown in FIG. 7 with like parts being given like reference numerals with a prime suffix ('). In this embodiment the barge 10' is provided with a bifurcated bracket 60 at locations which are adjacent the pile cluster 24'. The horizontal extensions 52' on the pile clusters have a vertical slot 53' cut in their outer ends to receive the theaded end portion of the reciprocating arm 62 of a hydraulic jack 64. The jack of course would not have to be hydraulic, as any suitable mechanical or pneumatic jack could perform the same function. The opposite end of the jack is pivotally connected by a pivot pin 66 to the bifurcated bracket 60 so that the reciprocating arm 62 of the jack can be swung into the slot 53' when the barge is positioned at the unloading site. Two locknuts 67 and 68 are threaded on the arm 62 to lock the arm to the pile cluster when the barge is properly elevated in the water.

To stabilize the barge with the apparatus shown in FIG. 7, the pile clusters would be driven as described hereinbefore with regard to the method and apparatus of FIGS. 1 through 6B. The barge would then be positioned between the pile clusters and locked in place horizontally by the positioning rods 55 adjacent the unloading site so that the hydraulic jacks 64 are alongside the pile clusters. The jacks would then be pivoted up so that the reciprocating arms 62 lie in the slots 53' on the pile clusters. The locknuts 67 and 68 would then be tightened against the upper and lower surface of the horizontal extension 52' of the pile cluster to prevent the jack from pivoting relative to the pile cluster. The jacks would then be extended to drive the barge lower into the water, or withdrawn to raise the barge up in the water, whichever is required to align the rails 16 on the barge with the rails 22 at the unloading site. Normally, however, in the event the barge needed to be lowered in the water, the barge could be partially flooded to reduce its buoyancy so that it would be easier to move down by the jacks.

Still another embodiment of an apparatus for vertically positioning and stabilizing a barge according to the principles of the present invention is shown in FIG. 8 with like parts given like reference numerals with a double prime suffix (''). In this embodiment a threaded stabilizing rod 70 is pivoted on a bifurcated bracket 72 secured to the deck of the barge 10''. The rod is provided with locknuts 74 and 76 whereby the rod can be rigidly attached in a slot 53'' to an extension 52'' of the pile cluster thereby preventing relative pivotal movement. To stabilize the barge at the proper depth in the water, the barge can be flooded to reduce its buoyancy keeping control of the depth by adjusting the locknuts 74 and 76 on the threaded shaft. If the barge is lowered too far by the flooding and needs to be raised to align the rails, the water used to flood the barge can be pumped out of the barge to increase the buoyancy and the upward movement of the barge controlled by the locknuts.

Still another embodiment of the invention is shown in FIG. 9 with like parts being given like reference numerals with a triple prime suffix ('''). In this embodiment a bracket 80 is secured to each pile cluster 24''' and is provided with a horizontal bore. A large diameter vertical stabilizing rod 82 is secured to the deck of the barge 10''' adjacent the pile cluster locations. The stabilizing rod 82 has a plurality of vertically aligned apertures 84 corresponding in size to the bore in the bracket 80 so that a pin 86 can be inserted through the rod 82 and the bracket 80 to lock the barge at a given depth in the water.

The depth of the barge in the water could be adjusted by a procedure similar to that described in connection with FIG. 8, with the locking of the barge at any depth being carried out with the pin-bracket device as opposed to the locknuts on the threaded rod.

It should be understood that the sum total of the vertical forces imposed on the barge when the barge is stationary will always be zero. When the upward buoyant force of the water on the barge is greater than the downward force resulting from the combined weight of the barge and the reactor vessel, the pile clusters will impose a downward force on the barge sufficient to effect a net vertical force of zero. This downward force imposed by the pile clusters will create an equal and opposite upward force on the clusters which tends to force the clusters up and out of their embedded disposition in the bottom of the body of water. To avoid the possibility of the pile clusters being lifted in this manner the barge can be filled to any desired level with water thereby creating an additional downward force. By appropriately controlling the amount of water pumped into the barge the forces exerted on the pile clusters can be virtually eliminated prior to the unloading operations.

It will be appreciated that as the reactor vessel is rolled off the barge the weight distribtuion will change so that the pile clusters closest to the unloading site will begin to support a portion of the vessel's weight and will increasingly support more and more of the weight. At the same time the pile clusters which are furthest removed from the unloading site will experience an upward force due to the buoyancy of the supporting body of water. To minimize this change in force on the pile clusters as the vessel is rolled off the barge, the barge can be flooded in a carefully controlled manner.

In order to understand this flooding procedure it is important to know that the barge is provided with a plurality of internal water-tight compartments C-1 through C-15 (FIG. 10) which may be flooded independently or as a group by a pumping system on the barge. The pumping system includes a pump 100 having a depending conduit 102 extending down an external side of the barge into the body of water 12. A main pipeline 104 disposed beneath the deck of the barge is also connected to the pump and extends through all 15 compartments. Within each compartment C1 through C15 the main pipeline has a depending connecting pipe 106 which extends substantially to the bottom of the barge. A valve 108 in each connecting pipe 106 controls the flow of water through its associated connecting pipe. The valves are operated at a control station 110. When the pump is normally operated, water is drawn through conduit 102 and pumped through the main pipeline 104 and into any preselected compartment whose associated valve 108 is open. The pump can also be operated in reverse whereby water in the compartments can be pumped back through the pipeline 104 and conduit 102 into the body of water 12.

With this understanding of the construction of the barge, the controlled flooding procedure which is used to minimize the varying foces imposed on the pile clusters can now be described. As was pointed out above, as the reactor vessel is being rolled off the barge, the pile clusters closest to the unloading site will experience an increasing downward force while the pile clusters furthest removed from the site will experience an increasing upward force. The upward force on the furthest removed pile clusters can be virtually eliminated by pumping water first into the compartments C1 through C3 at the front of the barge which compartments are located near the furthest removed pile clusters. The increased weight of the barge at the front end of the barge due to the pumped water can be controlled to substantially counterbalance the increasing upward force on the pile clusters as the vessel is rolled off the barge. In this manner the net vertical forces on the furthest removed pile clusters can be maintained at approximately zero. It will be apparent that when the compartments C1 through C3 have been flooded the adjacent row of compartments C4 through C6 and each successive row can be flooded as needed.

As an additional safety factor, it is contemplated that the stop plates 28 and 34 on each pile cluster can be secured together during the unloading operation as by a pair of bolts 112 (FIG. 3) having locknuts 114 on either end to prevent the stop plates from separating. These bolts will be especially beneficial when the vessel leaves the barge at which time a sizable upward thrust will be imposed on the barge due to the lost weight of the vessel.

From the foregoing it can be seen that a very safe, efficient, and expedient method of stabilizing a barge has been described. It will be apparent to those skilled in the art that at certain unloading sites not all of the disclosed apparatus will need to be used to effect a safe unloading operation as any numerous combinations of the stabilizing means may be completely adequate under certain environmental conditions. Therefore, the invention is intended to include any and all combinations encompassed within the spirit and scope of the following claims.

I claim:

1. Apparatus for stabilizing a barge in a body of water so that heavy loads can be rolled off the barge without disrupting its stability, comprising a plurality of pilings between which the barge can be positioned, said pilings having first extensions which overlie a portion of the barge and second extensions which underlie a portion of the barge, and vertically adjustable means including means for positively and releasably connecting said first extensions to the barge and means supporting the barge from said second extensions whereby the barge is positively prevented from vertical movement in the water.

2. The apparatus of claim 1 wherein said pilings have extensions which overlie a portion of the barge and wherein said vertically adjustable means are positively and releasably connected between the extensions and the barge.

3. The apparatus of claim 2 wherein said vertically adjustable means are pivotally connected to the barge and can be swung upwardly for rigid attachment to said extensions.

4. The apparatus of claim 2 wherein said vertically adjustable means comprise jacks operatively connected between the barge and the extension of said pilings.

5. The apparatus of claim 1 further including horizontally adjustable means operatively connected between said pilings and the barge for horizontally positioning and maintaining the horizontal position of the barge between the pilings.

6. Apparatus for stabilizing a barge in a body of water so that heavy loads can be rolled off the barge without disrupting its stability, comprising a plurality of pilings along two sides of the barge and adjacent an unloading site, said pilings having substantially horizontally extending extensions overlying a portion of the barge, jacks pivotally mounted on the barge in a position to be swung up and attached to one of said overlying extensions, the attachment to said extension being such that the barge is held immobile both in regard to upward and downward movement without extension or retraction of said jack.

7. Apparatus for stabilizing a barge in a body of water so that heavy loads can be rolled off the barge without disrupting its stability, comprising a plurality of pilings along two sides of the barge and adjacent an unloading site, said pilings having substantially horizontally extending extensions overlying a portion of the barge, threaded adjustment rods positively and releasably connected between the extensions and the barge, supporting shelves extending substantially horizontally away from said pilings so as to underlie a portion of said barge, and vertically adjustable jacks supported by said shelves and engaging an underside of said barge whereby an upward vertical force can be exerted on said barge so that the jacks and the adjustment rods prevent the barge from moving upwardly or downwardly in the water regardless of the buoyancy of the barge or a changing load distribution.

* * * * *